(12) United States Patent
King

(10) Patent No.: US 6,328,900 B1
(45) Date of Patent: Dec. 11, 2001

(54) KIT AND METHOD FOR CONVERTING WATER CIRCULATION SYSTEM TO WATER CIRCULATION AND PURIFICATION SYSTEM

(76) Inventor: Joseph A. King, 142 Chevy Chase Dr., Wayzata, MN (US) 55343

(*) Notice: Subject to any disclaimer, the term of this patent is extended or adjusted under 35 U.S.C. 154(b) by 0 days.

(21) Appl. No.: 09/344,985

(22) Filed: Jun. 25, 1999

(51) Int. Cl.[7] .............................. E04H 4/12; B01D 35/00; E03D 9/02
(52) U.S. Cl. .................. 210/754; 210/764; 210/169; 210/205; 422/37; 4/222
(58) Field of Search .................................... 210/169, 754, 210/205, 764; 4/507, 538, 222; 422/37

(56) References Cited

U.S. PATENT DOCUMENTS 3,832,741 * 9/1974 Ward .
4,420,394 * 12/1983 Lewis ................................. 210/169
4,702,270 * 10/1987 King, Sr. .
5,581,826 * 12/1996 Edwards ................................. 4/507
5,662,795 * 9/1997 Pickens et al. ....................... 210/169

* cited by examiner

Primary Examiner—Chester T. Barry
(74) Attorney, Agent, or Firm—Jacobson & Johnson

(57) ABSTRACT

A kit for converting a water circulation system in a hot tub into a water purification system including a housing that can be fixedly mounted to a spa or hot tub, a chamber in the housing, an inlet for splicing into the spa water circulation system, and an outlet for splicing into the spa water circulation system, a dispenser for mounting in the chamber in the housing with the dispenser containing water purification materials so that when water flows through the spa water circulation system the water also flows through the chamber with the water purification material to simultaneously purifies the water and direct jets of water into the hot tub.

20 Claims, 3 Drawing Sheets

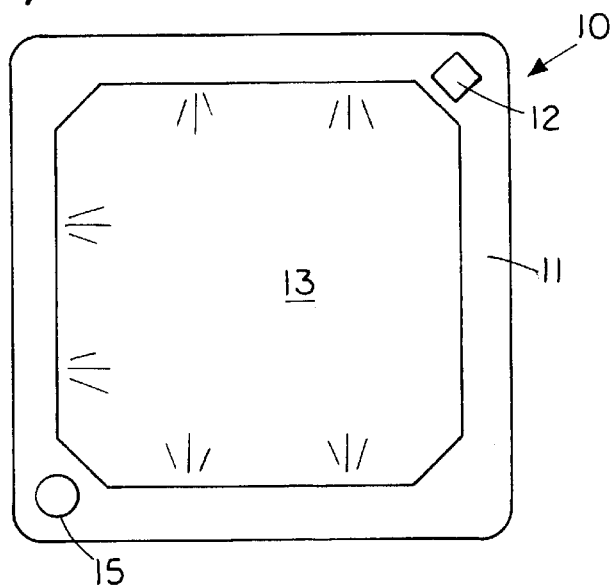
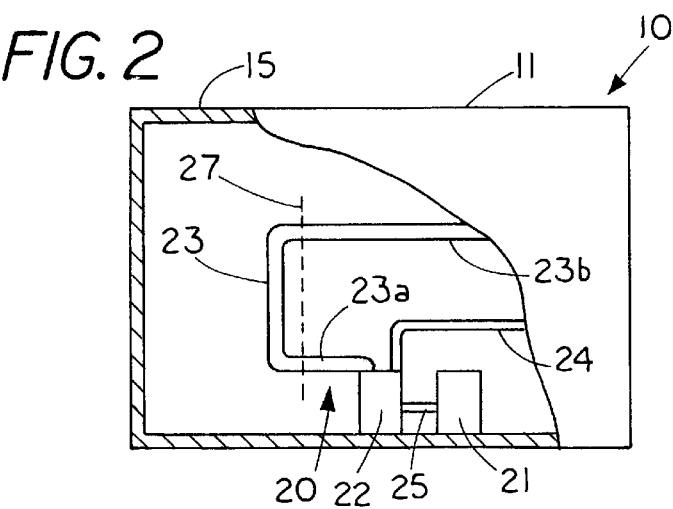
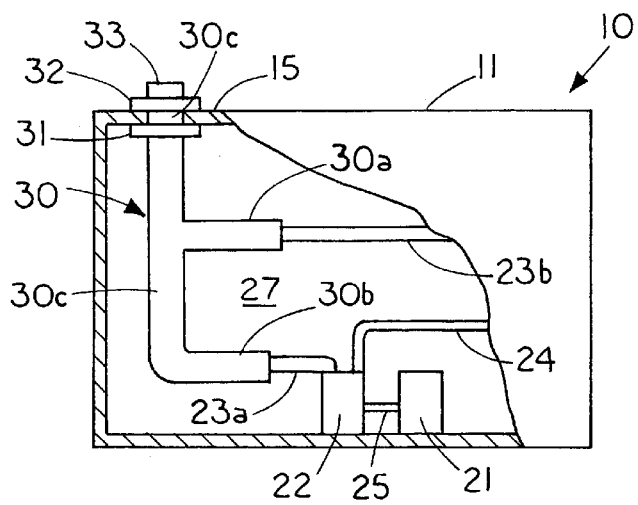
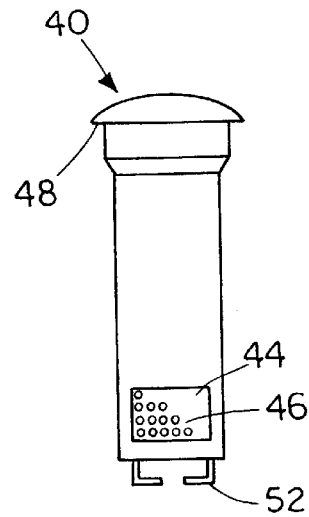

KIT AND METHOD FOR CONVERTING WATER CIRCULATION SYSTEM TO WATER CIRCULATION AND PURIFICATION SYSTEM

FIELD OF THE INVENTION

This invention relates generally to kits and more specifically to a kit for converting a spa or hot tub water recirculation system into a spa water recirculation and purification system.

BACKGROUND OF THE INVENTION

Spas or hot tubs are known in the art and usually comprise a large tub or container with an integral water circulation system for circulating the water. Typically, water in the container is directed via water water into the body of water in the container. In order to maintain the purity of the water, chemicals such as bromine, chlorine or the like are periodically added to the water to kill the bacteria therein by measuring an amount of chemical and then pouring the chemical into the water. The disadvantage of such an external chemical system is that one must regularly monitor the water to determine if the bacteria count is below acceptable levels and one must handle the chemicals as the chemicals are poured into the water. The present invention provides a kit having a housing that can be spliced into the existing water circulation system of the spa so that the water can circulate through water purification materials that are held in confinement within a chamber of the housing.

SUMMARY OF THE INVENTION

Briefly, the kit comprises a housing that can be fixedly mounted to a spa or hot tub, a chamber in the housing, an inlet for splicing into the spa water circulation system, and an outlet for splicing into the spa water circulation system, a dispenser for mounting in the chamber in the housing with the dispenser containing water purification materials so that when water flows through the spa water circulation system the water also flows through the chamber with the water purification material to simultaneously purify the water and direct jets of water into the hot tub.

BRIEF DESCRIPTION OF THE DRAWINGS

FIG. 1 is a top view of a hot tub with a hole cut therein for installation of the water purification kit therein;

FIG. 2 is a side view of the hot tub of FIG. 1 with a portion of the side cut-away to reveal the water circulation system therein;

FIG. 3 is the side view of FIG. 2 with the water kit spliced to the water purification kit which is fixedly mounted in the top of the hot tub;

FIG. 4 is a side view of first dispenser for holding a dispersant therein with the dispenser including a connector on one end;

DESCRIPTION OF THE PREFERRED EMBODIMENT

Figure 5:
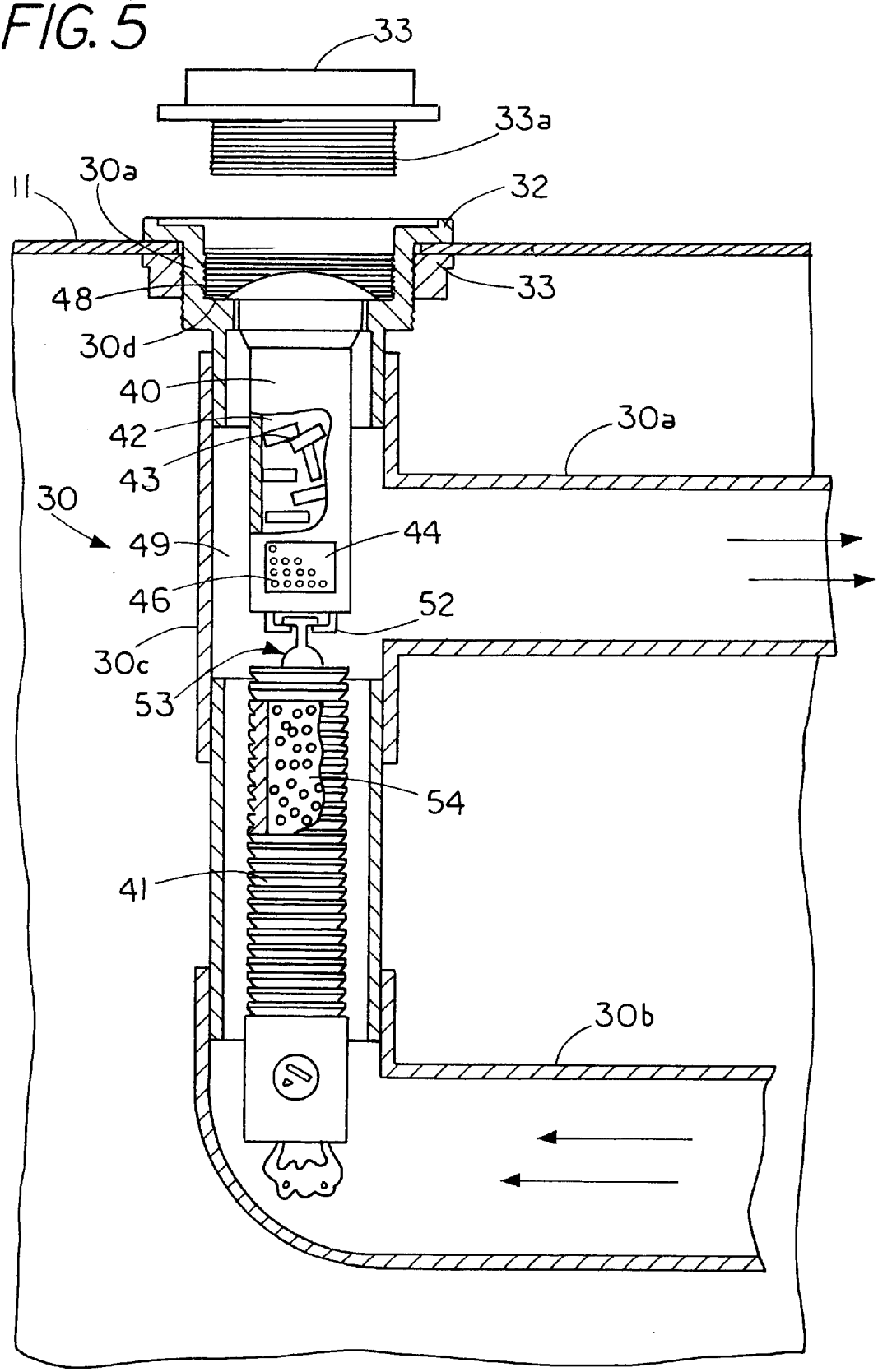
FIG. 5 shows a cross-sectional view showing the water purification kit connected to the water circulation system and a pair of water purification dispensers located therein.

FIG. 1 shows a top view of a hot tub or spa 10 having a top ledge 11 with a set of controls mounted therein for controlling the temperature and water circulation of the water in the compartment 13. Normally, the control of bacteria and algae in the hot tub is controlled by using a measuring cup to pour chemical water purification materials directly into the open body of water in compartment 13. With the present invention the addition of chemicals directly into the water in compartment 13 can be avoided.

The present invention allows one to convert the hot tub water purification system from an open system where chemicals are externally poured into the spa to a closed system where water purification materials are introduced into the water through a dispenser located in the water circulation system.

The first step in installing the present invention is to cut a hole 15 in top ledge 11. FIG. 2 shows a partial cut-away view of hot tub 10 which reveals the spa water circulation system 20 that includes a motor 21 with a shaft 25 that drives pump 22 which has an outlet 23 comprised of lower member 23a and upper member 23b for directing water into the hot tub compartment 13 and an inlet 24 for receiving water from the compartment of the hot tub. For convenience in understanding where the present invention is spliced into the existing water circulation system a dashed line 27 is shown that extends through outlet 23. In the second step in installing the present invention the outlet 23 is cut along dashed line 27 to leave open end 23a and 23b.

FIG. 3 shows the kit 30 mounted in tub 10 with housing 30c having an upper connector 30a connected to end 23b and a lower connector 30b connected to end 23a to form a passage through housing 30c. Kit 30 has been mounted in top ledge 11 by extending a threaded neck 32e of housing 30c through the opening 15 and securing the neck 32e of housing to ledge 11 by a pair of large nuts 31 and 32. By tightening nuts 31 and 32 one can secure housing to ledge 11. Thus FIG. 3 shows that the present invention includes a housing that has upper connector 30a and lower connector 30b that can be connected into the water circulation system to direct the water therethrough and a neck 30e for mounting the housing in a through hole in the top ledge of the hot tub. As can be seen in FIG. 3 spa 30 has an interior region 29 which is normally covered by a panel or the like. FIG. 3 shows housing 30 mounted in the interior region 29 in an out-of-the-way condition with only a portion of neck 30e, nut 32 and removable cap 33 located outside of the spa 10. Removable cap 33 provides external access to housing 30c.

Referring to FIG. 5 the kit 30 is shown partially in cross section to reveal water purification dispensers or canisters 40 and 41 that are mounted within a chamber 49 of central housing 30c. Cap 33 is shown removed from housing 30 to illustrate the wide opening that allows for insertion of canisters 40 and 41 into housing from a position above ledge 11. That is, the canisters 40 and 41 can be removed or inserted into housing 30c after removing cover 33 from housing 33c.

Canister 40 is shown partially in section to reveal an interior compartment 42 having a solid water purification material such as chlorine or bromine located thereon. Located on the lower portion of canister 40 is a slideable member 45 that can be rotated to increase or decrease the number of holes 46 to provide for more or less ingress and egress of water into compartment 42. The passage of water into and out of the compartment 42 causes the dispersant 43, which in this case is either bromine or chlorine, to be dispensed into the water in the system. A dispenser for adjustable dispensing water purification chemicals is shown in U.S. Pat. No. 4,702,270.

Dispenser 40 includes an annular upper lip 48 that rests on annular lip seat 30d to maintain dispenser 40 in a central, suspended condition within housing 30c. Located on the bottom of dispenser 40 is a connector 52 that is engagement with a connector 53 which is on the second dispenser 41. A portion of the second dispenser has also been cutaway to reveal water purification minerals 54 therein. In the embodiment shown the dispenser 41 comprises a mineral type of dispenser which contains solid water purification materials 54. Dispenser 41 also includes a series of openings to allow water to flow from chamber 49 through minerals 54. Suitable minerals for use in the dispenser included zinc, silver chloride or the like, however, it should be understood that other solid water purification minerals could be used in the present invention. In some instances limestone can be added to the water purification materials to assist in controlling the pH of the water.

In operation of the water purification dispensers in kit 30 the water flows though an inlet formed by lower connector 30b around and through dispenser 41 and around and through dispenser 40 and out an outlet formed by upper connector 30a. Thus with the kit 30 of the present invention one is able to convert an open existing water circulation system that required pouring of water purification materials into open water into a closed system where the water purification minerals dispensing system is part of the water circulation system. As the kit can be mounted on the interior of the hot tub there is no unsightly obstruction around the tub. In addition the use of a cap 33 on top of ledge 11 allows one to insert and replace the dispensers 40 and 41 within housing 30 as the dispenser become spent.

Figure 6:
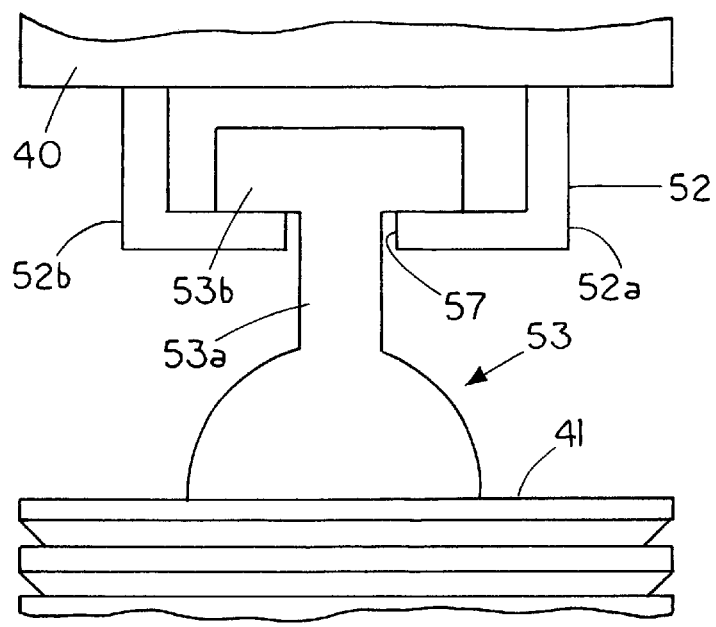
FIG. 6 shows the connectors on the water purification dispensers to enable one to attach or detach the dispensers to each other.

FIG. 4 shows an isolated view of canister 40 with annular lip 48 for engaging the lip seat in housing 30. The connector 52 is shown affixed to the bottom of dispenser 40. To reveal the nature of the connector engagement, reference should be made to FIG. 6 which shows an enlarged view of connector 52 having two L-shaped legs 52a and 52b that extend laterally inward with a slot 57 located therebetween. Extending though slot 57 is T-shaped connector 53 which includes an extension 53a and a top member 53b that forms a friction fit with legs 52a and 52b to hold the connectors 53 and 52 in engagement with each other. The connectors 52 and 53 can be disengaged from each other by sliding leg 53 outward to disengage legs 53a and 53b. Thus dispenser 41 can be disconnected from dispenser 40 to allow a user to replace one of spent canisters in the event that the water purification materials in one canister is consumed before the water purification materials in the other canister.

With the embodiment shown in FIG. 5 it is apparent that the two dispensers can be held in an end-to-end relationship within the housing and that either a single or double canister can be used. In addition, if two canisters are used and one is spent one canister can be removed and replaced by another canister. By having the canister in an end-to-end relationship the canisters can be easily inserted and removed from the housing as a single unit. Thus, a hot tub which previously required the user to pour bulk chemicals directly into the water in the hot tub can now receive water purification materials through the water circulation system.

Figure 7:
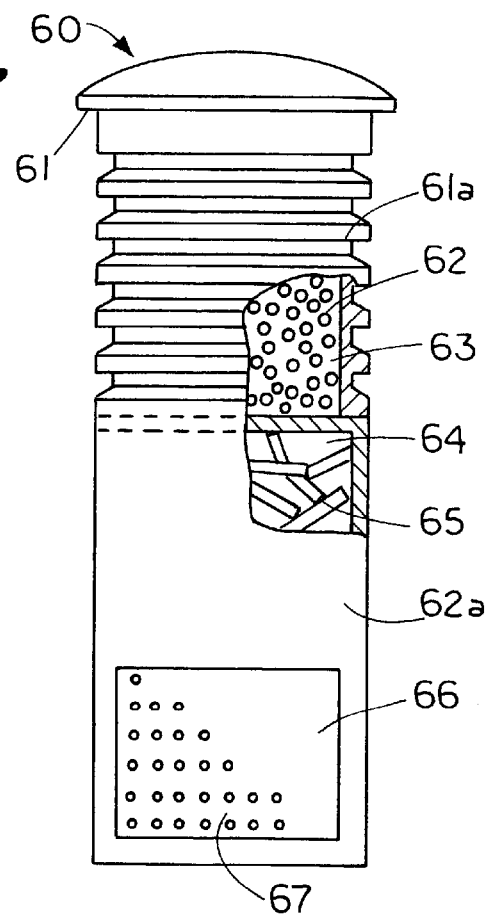
FIG. 7 shows an alternate embodiment wherein a single dispenser is provided with two compartments for holding different water purification materials therein.

FIG. 7 shows a variation of the two dispenser system where the water purification materials are consumed over a similar time period. The dispensers 60 has two separate compartments for the water purification materials. Dispenser 60 is shown with an annular lip 61 for engagement with the annular seat in housing 30. Dispenser 60 includes a top section 61a having an upper compartment 62 containing a first water purification material 63 therein and a lower compartment 64 containing a second water purification material 65 therein. A sliding door 66 with openings therein is included to control the ingress and egress of water from dispenser 60. The relative size of the two compartments is designed so that each compartment can hold sufficient water purification materials for an extended period of time.

The present invention further contemplates the invention of converting a water circulation system into a water circulation and purification system by the steps of a) cutting the water circulation line in the hot tub water circulation system, b) splicing a housing having a chamber for dispensing water purification materials into the water circulation line, c) cutting a hole in the hot water tub ledge and attaching the housing to the hot tub with only a portion of the housing and a cap exposed, d) placing a dispenser or dispensers into the chamber in the housing so that water circulating therethrough passes through the water purification materials to thereby purify the water.

I claim:

1. A kit for converting a spa water circulation system into a water purification system for a contained water volume comprising:

a dispenser housing, said dispenser housing having a chamber therein, said dispenser housing having a first portion for securing to a portion of a spa housing to hold said dispenser housing exterior the contained water volume and in a fixed position on the spa housing, a cap, said cap being removably attachable to said dispenser housing exterior the contained water volume for opening and closing said dispenser housing to provide access to the chamber in said display housing;

an inlet member connected to said dispenser housing for directing said water into the chamber in said dispenser housing;

an outlet member connected to said housing for directing said water away from said chamber;

a first dispense located in the chamber in said dispenser housing, said first dispenser having a first water purification material in the form of solid dispersant therein for dispensing the dispersant therein into water flowing through said chamber, said first dispenser including a connector thereon;

a second dispenser located in said dispenser housing, said second dispenser containing a second water purification material different from said first water purification material, said second dispenser suspended in said chamber in said dispenser housing to permit water to flow therethrough, said second dispenser having a connector, said connector on said second dispenser engageable with said connector on said first dispenser to permit said dispenser and said second dispenser to be inserted or removed as a unit, said first dispenser and said second dispenser separable from each other to permit replacement of either of the dispensers in the event the water purification materials therein are spent; and a lip member on said first dispenser, said lip member for maintaining said first dispenser in said chamber.

2. The kit of claim 1 wherein said first dispenser includes an adjustable opening for controlling the amount of dispersant therefrom.

3. The kit of claim 1 wherein said first dispenser includes chlorine.

4. The kit of claim 1 wherein said first dispenser includes bromine.

5. The kit of claim 1 wherein said second dispenser includes a water purification material including zinc, limestone and silver chloride.

6. The kit of claim 1 wherein one of said dispensers includes silver chloride.

7. The kit of claim 6 wherein said second dispenser includes zinc and silver chloride.

8. The kit of claim 1 wherein said connector on said first dispenser is located on an end of said first dispenser and said connector on said second dispenser is located on an end of said second dispenser so that the first dispenser and said second dispenser can be positioned in an end-to-end relationship in said chamber.

9. The kit of claim 1 wherein said housing comprises a plastic.

10. A kit for converting a water circulation system into a water purification system comprising:
   a housing, said housing having a chamber therein for receiving a water purification dispenser, said housing having a first portion for securing to a portion of a housing to hold said housing in a fixed position thereon;
   an inlet member connected to said housing for directing said water into the chamber in said housing;
   an outlet member connected to said housing for directing said water away from said chamber;
   a cap, said cap being removably attachable to said housing for opening and closing said housing to provide access to the chamber in said housing;
   a dispenser removably positioned in the chamber of said housing so that the water purification dispenser can be periodically removed from said housing and replaced with a fresh water purification dispenser; and
   a lip on the dispenser, said lip for maintaining said dispenser in said chamber.

11. The kit of claim 10 wherein the dispenser includes a first compartment with said first compartment having a first water purification material in the form of solid dispersant therein for dispensing the dispersant therein into water flowing through said chamber and a second compartment with said second compartment containing a second water purification material different from said first water purification material.

12. The kit of claim 10 wherein the dispenser includes a member for limiting ingress and egress of water from said dispenser.

13. A kit for converting a water circulation system into a water purification system comprising:
   a housing, said housing having a chamber therein for receiving a water purification dispenser, said housing having a first portion for securing to a portion of a housing to hold said housing in a fixed position thereon;
   said housing having a neck and a fastener located proximate the first end of the housing, the fastener securely attached to the neck of the housing to provide support for the housing;
   an inlet member connected to said housing for directing said water into the chamber in said housing;
   an outlet member connected to said housing for directing said water away from said chamber thereby providing for circulation of water through said chamber;
   a cap, said cap being removably attachable to said housing for opening and closing said housing to provide access to the chamber in said housing; and
   a water purification dispenser removably positioned in the chamber of said housing so that the water purification dispenser can be periodically removed from said housing and replaced with a fresh water purification dispenser, said water purification dispenser having a plurality of holes to provide for ingress and egress of water.

14. The method of converting a water circulation system for a contained water volume into a water purification system for the contained water volume comprising:
   a) cutting a water circulation line exterior the contained water volume in the water circulation system;
   b) splicing into the water circulation system for the contained water volume a dispenser housing having a chamber for the dispensing purification material;
   c) attaching, the dispenser housing having a removable cap within a support aperture, the supported dispenser housing and removable cap exterior the contained water volume; and
   d) placing a dispenser contain a water purification material into the chamber in the dispenser housing exterior the contained water volume, so that water circulating there though passes through the water purification materials to thereby purify the water.

15. The method of claim 14 wherein the dispenser is placed into the water circulation system by inserting the dispenser into an opening in the dispenser housing located beneath the removable cap.

16. The method of converting a water circulation system in a spa into a water purification system comprising:
   a) cutting a water circulation line in the hot tub water circulation system;
   b) splicing a housing having a chamber for dispersing water purification material into the water circulation system;
   c) attaching the housing to the hot tub with only a portion of a cap of the housing exposed; and
   d) placing a dispenser containing a water purification material into the chamber in the housing so that water circulating there through passes through the water purification material to thereby purify the water.

17. The method of claim 16 including controlling the amount of dispersant dispensed from the dispenser by opening a door located on the dispenser.

18. The method of claim 17 including placing a second dispenser in an end-to-end relationship with the first dispenser.

19. The method of claim 16 including placing a second dispenser containing silver chloride into the chamber of the housing.

20. The method of claim 16 including placing a second dispenser containing a water purification material including zinc, limestone, and silver chloride into the chamber of the housing.

* * * * *